US009014316B2

(12) United States Patent
Houtari et al.

(10) Patent No.: US 9,014,316 B2
(45) Date of Patent: Apr. 21, 2015

(54) METHOD AND APPARATUS UTILIZING MULTIPLE TRANSMISSION RECEIVERS

(71) Applicant: Broadcom Corporation, Irvine, CA (US)

(72) Inventors: Arto Ilmari Houtari, Oulu (FI); Risto Juhani Paatelma, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/890,474

(22) Filed: May 9, 2013

(65) Prior Publication Data

US 2013/0301765 A1 Nov. 14, 2013

(30) Foreign Application Priority Data

May 9, 2012 (GB) .................................. 1208117.0

(51) Int. Cl.
*H04B 7/10* (2006.01)
*H04B 1/10* (2006.01)
*H04J 11/00* (2006.01)
*H04B 7/08* (2006.01)

(52) U.S. Cl.
CPC ............ *H04B 1/1081* (2013.01); *H04B 7/0874* (2013.01); *H04J 11/0063* (2013.01)

(58) Field of Classification Search
CPC ......... H04L 1/06; H04L 1/02; H04L 27/2647; H04B 7/0413; H04B 17/0042; H04B 7/0845; H04B 7/02
USPC .................................. 375/222, 340, 347, 349
See application file for complete search history.

(56) References Cited

U.S. PATENT DOCUMENTS 6,078,801 A 6/2000 Souissi
7,929,921 B2 * 4/2011 Love et al. ..................... 455/101

(Continued)

FOREIGN PATENT DOCUMENTS

EP 1384361 A1 3/2001
EP 2271002 A2 1/2011

(Continued)

OTHER PUBLICATIONS

Advanced Receiver Architectures for HSDPA and Their Performance Benefits, Author: Arunabha Ghosh, Richard Kobylinski, SBS Laboratories, Inc., United States; Dated Oct. 14, 2005.

(Continued)

*Primary Examiner* — Don N Vo
(74) *Attorney, Agent, or Firm* — Oblon, McClelland, Maier & Neustadt, L.L.P.

(57) ABSTRACT

A communications method uses simultaneously at least two receivers to reduce a need for data retransmissions. When using multiple receivers it is enough that at least one of the receivers outputs a correct bit set which are preferably checked by Cyclic Redundancy Check (CRC). The method comprises the following to be performed in a radio modem: a) receiving the same sample of a signal in a first receiver and in a second receiver; and in response to the same sample b) obtaining a first bit set from the first receiver and a second bit set from the second receiver; and c) determining whether the first bit set or the second bit set is a correct bit set. A retransmission request is sent only when the first and second bit sets are erroneous. This reduces latencies in the transmission. One can change receivers depending on the radio frequency (RF) circumstances.

17 Claims, 4 Drawing Sheets

(56) References Cited

U.S. PATENT DOCUMENTS

| | | | |
|---|---|---|---|
| 2009/0147834 A1* | 6/2009 | Kishigami et al. | 375/148 |
| 2011/0051858 A1* | 3/2011 | Salvekar et al. | 375/341 |
| 2013/0223490 A1* | 8/2013 | Collins et al. | 375/222 |

FOREIGN PATENT DOCUMENTS

| | | |
|---|---|---|
| JP | 2007208797 A | 8/2007 |
| WO | 2008/005583 A2 | 1/2008 |

OTHER PUBLICATIONS

Practical Chip-level Equalizers in HSDPA; Dated May 5, 2008.
ARTM equalize 2 LinearRx Lecture Notes; Dated May 7, 2012.
White Paper—Dual Cell HSDPA and its Future Evolution; Dated Jan. 16, 2009.
Dynamic Performance of a Chip Level Adaptive Equalizer in a UMTS High Speed Downlink Packet Access (HSDPA) Terminal; Vehicular Technology Conference, 2006. VTC-2006 Fall. 2006 IEEE; Conference Date Sep. 25-28, 2006.

\* cited by examiner

METHOD AND APPARATUS UTILIZING MULTIPLE TRANSMISSION RECEIVERS

CROSS REFERENCE TO RELATED APPLICATIONS

This application claims benefit under 35 U.S.C. §119(a) and 37 CFR 1.55 to UK patent application no. GB1208117.0, filed on 9 May 2012, the entire contents of which are hereby incorporated by reference.

TECHNICAL FIELD

The present application relates generally to Radio Access Networks (RANs), High Speed Packet Downlink Access (HSPDA), and radio modems.

BACKGROUND

Universal Mobile Telecommunication System (UMTS), Universal Terrestrial Radio Access Network (UTRAN), a Long Term Evolution (LTE) network called Evolved UTRAN (E-UTRAN), and an LTE advanced network are some examples of RANs. A base station, or an evolved Node B (eNB) in the 3rd Generation Partnership Project (3GPP) LTE, assigns radio resources to a user equipment (UE) and signals this information to the UE. The UE in the present application is a mobile terminal or another type of device.

Transmissions are divided in LTE into 1 ms time periods called subframes. The radio resources, which are assigned to the UE, are available in a subframe on a certain channel of the LTE network, far example, on the Physical Downlink Shared Channel (PDSCH) or the Physical Uplink Shared Channel (PUSCH). Control channels are used for requesting and allocating radio resources, for example the Physical Downlink Control Channel (PDCCH) and Physical Uplink Control Channel (PUCCH) are the control channels of LTE. The eNB sends a downlink (DL) assignment or an uplink (UL) grant to the UE when the resources are assigned for the UE. Then the DE uses the resources for data reception according to the DL assignment, or for data transmission according to the UL grant. A transmission of a packet may fail. When a retransmission of the packet is needed, the retransmission is performed, for example, using Hybrid Adaptive Repeat and Request (HARQ).

HSPA (High Speed Downlink Access) was included in the 3GPP Releases 5 and 6 for downlink and uplink transmissions. "HSPA evolution", also termed "HSPA-+", is a work that has progressed in parallel to Long Term Evolution (LTE) work in the 3GPP. Many of the technical solutions in the HSPA evolution and LTE are quite similar. The HSPA evolution and LTE include technical solutions for mobile networks, home base stations (femto cells), and self-optimized networks. The HSPA evolution aims to improve performance for the end user by lower latency, lower power consumption, and higher data rates.

HSPA is based on Wideband Code Division Multiple Access (WCDMA). WCDMA utilizes the Time Division Duplex (TDD) or the Frequency Division Duplex (FDD) mode in order to provide total duplex communication on 10 ms frames. In TDD mode both the uplink data and the downlink data can be transferred over a single 5 MHz channel along with time multiplexing. Conversely, the FDD mode utilizes two separate uplink and downlink channels which are in one option separated by a 190 MHz band. In 1999 the 3GPP published such a version of WCDMA that provided data rates up to 2 Mbps. Later, the 3GPP defined WCDMA/HSPA that uses 16 QAM (Quadrature Amplitude Modulation) as the digital modulation scheme increasing the data rates up to 14.4 Mbps.

In wireless telecommunications, single-path propagation and multipath propagation are the phenomenons relating to reception of a radio signal. A single-path signal reaches a receiving antenna via a single path and is multipath signal reaches the antenna via two or more paths. Causes of the multipath propagation include atmospheric ducting, ionospheric reflection and refraction, and reflection from water bodies and terrestrial objects, such as hills and buildings. The to multipath propagation results in constructive and destructive interference, and phase shifting of the signal. The destructive interference causes fading. Also a single-path signal may fade. The fading needs to be modelled in order to demodulate the single-path signal or the multipath signal in a correct way, i.e. so that the original information can be extracted from it.

In the multipath propagation a signalling, which is traveled via some path to the receiving antenna, is termed a "multipath component". Rician fading is an appropriate fading model when one multipath component dominates. Usually this dominating multipath component is received via a line of sight path. For example, Rayleigh fading is a fading model that provides better reception quality than Rician fading, if there is no dominating multipath component.

A term "receiver" refers in the present application to an entity that is used in a reception of a signal. A rake receiver is typical example of a receiver.

FIG. 1 shows a radio modem 101 equipped with a reception antenna 102 and a rake receiver 103. The radio modem 101 counts the effects of multipath fading by using several "subreceivers" called fingers 104-106. Each finger decodes one multipath component 107-109 that has traveled via a different path from the transmitting antenna 110 to the receiving antenna 102. In this example, the multipath component 107 has traveled via the line of sight path to the antenna 102 and the other multipath components have reflected once from either of hills 111 before they have reached the antenna 102. The line of sight path is the shortest path to the antenna 102 and the other paths are longer. The longer the path the longer delays are included in the multipath component. The delays are estimated for each finger by using the following method. First, the radio modem 101 identifies the points of times at which significant energy packs are detected in the signal received through the antenna 102. The time differences between the multipath components 107-109 can be calculated on the basis of the energy peaks measured from the multipath components. The multipath component 107 is mapped to time difference $t_1$ and the value of $t_1$ is 0 because the multipath component 107 has traveled via the shortest path to the antenna 102. The other the multipath components 108 and 109 have traveled longer in meters and in milliseconds. The multipath component 108 is mapped to time difference $t_2$ and the multipath component 107 is mapped to time difference $t_3$. It is obvious on the basis of the path lengths shown in the FIG. 3 that $t_1 < t_2 < t_3$. The fingers 104-106 are then adjusted using correlators 112-114 with the time differences $t_1$, $t_2$, and $t_3$. After the use of the correlators 112-114 a phase and amplitude alignment 115 is performed. Now the multipath components 107-109 are adjusted to be as good as possible and they are combined in a combiner 116. The combiner 116 extracts data from the combined signal and outputs the extracted data 117. A checking unit 118 checks whether the extracted data 117 corresponds to the original data which the transmitting antenna 110 signalled. The checking unit may do this, for example, by using Cyclic Redundancy Check (CRC). If the extracted data is erroneous on the basis of the CRC, the checking unit 118 sends through a transmitter 119 a retransmission request 120. After that the retransmission of the data is expected to happen through the transmitting antenna 110. Otherwise, if the extracted data 117 is correct, it is output from the radio modem 101.

As mentioned in the above, geographical formations, such as hills and valley, and infrastructure, such as buildings, may deteriorate signal quality. When a UE moves, the signal quality may deteriorate for many reasons. For example, high movement speed of the UE causes the known Doppler phenomenon that deteriorates the signal quality. A long distance between the UE and the base station deteriorates the signal quality, especially when the UE arrives close to the border of the serving cell. The UE may need a handover at the border of the serving cell and the signal quality usually deteriorates during the handover. Handovers also relate to a multi-cell reception. The multi-cell reception and other issues relevant for the present application are discussed in the 3GPP TS 36.302, section 6.2.4.

In FIG. 1 the multipath components are originated from a single antenna, i.e. the transmitting antenna 110. Generally speaking, there may be two or more antennas transmitting multipath components. In addition to the multi-cell reception, the term "dual-cell HSDPA" is used in the prior art. The dual-cell HSDPA can be utilized so that two carriers of 5 MHz are allocated for the same UE. Then the signal reception at the UE comprises simultaneous reception of two signals on different carriers. This feature of the dual-cell HSDPA makes possible to accelerate the data rate of the transmission to 28 Mbps or even to 42 Mbps. The feature is discussed in: E. Seidel, J. Afzal, and G. Liebl, "White Paper—Dual Cell HSDPA and its Future Evolution", Nomor Research GmbH, Munich, Germany, January 2009.

A conventional rake receiver described in FIG. 1 operates quite badly in HSPA networks, thus scientists have developed a number of new receivers. Many of the receivers use equalizers. For example, the following two documents describe receivers which are based use of equalizers: 1) M. Park, W. Lee, M. Nguyen, and H. Soo Lee, "Practical Chip-Level Equalizers in HSDPA", Journal of Computers, vol. 3, no. 4, April 2008; and 2) A. Ghosh and R. A. Kobylinski, "Advanced receiver architectures for HSDPA and their performance benefits", Texas Wireless Symposium 2005.

FIG. 2 illustrates a prior art radio modem 201 in which a receiver 202 receives through an antenna set 203 a signal, or a multipath component of the signal, as an input 204. The antenna set 203 comprises one antenna or more antennas. The receiver 202 outputs a bit set 205 as a response to the input 204. The bit set 205 is an input for a checking unit 206. If the bit set 205 is correct, the checking unit 206 outputs it. Otherwise, the checking unit 206 generates a retransmission request 207. Details related to the checking unit 206 and the retransmission request 207 are omitted from FIG. 2 because they are quite irrelevant from point of view of the present invention. In addition to the rake receiver 103 shown in FIG. 1 and the two equalizer-based receivers mentioned in the above, there are many other receivers which can be utilized in signal reception in the radio modem 201.

Radio frequency (RF) circumstances change all the time, especially when a UE moves. One prior art problem is that whatever receiver is selected as the receiver 202 of the radio modem 201, the receiver has its own weaknesses, i.e. it operates badly when the signal to be received deteriorates in some specific way.

SUMMARY

In embodiments herein a radio modem may use simultaneously at least two receivers. For example, the radio modem uses at least temporarily the at least two receivers in the same time. The use of at least two receivers in signal reception provides such benefit that it reduces a need for data retransmissions. When using multiple receivers it is enough that at least one of the receivers outputs a correct bit set.

In embodiments herein the radio modem may use a single receiver, when radio characteristics are considered to meet predetermined criteria. For example, the radio modem starts to use a second receiver when the radio characteristics fail to meet the predetermined criteria.

In embodiments herein the at least two receivers may be fixed. In other embodiments, the at least receivers may be changeable, i.e. the radio modem ends the use of a receiver and starts to use an alternative receiver. For example, the radio modem has a receiver group and a group of available receivers from which a receiver can be selected. The group of available receivers may be at least as large as the receiver group that comprises the receivers currently in use at the UE.

A method in accordance with some embodiments concerns signal reception. The method can be utilized in a downlink direction and in an uplink direction, thus the method can be utilized in the UE as well as in the base station serving the UE.

According to one aspect, the present invention provides a method of signal reception in a radio access network, the method performed in a radio modem and comprising:
receiving the same sample of a signal in a first receiver and in a second receiver;
obtaining a first bit set from the first receiver and a second bit set from the second receiver; and
determining whether the first bit set or the second bit set is a correct bit set.

An apparatus in accordance with embodiments of the present invention is capable of performing the above-described method of signal reception sample-by-sample. In the certain RF circumstances, the signal reception comprises reception of multipath components of a signal.

According to one aspect, the present invention provides an apparatus for receiving a radio signal, comprising:
at least one processor; and
at least one memory including computer program code,
the at least one memory and the computer program code configured to, with the at least one processor, cause the apparatus to perform at least the following:
receive the same sample of the radio signal in a first receiver and in a second receiver;
obtain a first bit set from the first receiver and a second bit set form the second receiver; and
determine whether the first bit set or the second bit set is a correct bit set.

According to one aspect, the present invention provides a data carrier storing software instructions which, when executed by a processor, perform a method as described above.

Other aspects and embodiments will become apparent form the following description and claims.

BRIEF DESCRIPTION OF THE DRAWINGS

For a more complete understanding of examples and embodiments of the present invention, reference is now made to the following description taken in connection with the accompanying drawings in which.

DETAILED DESCRIPTION OF THE INVENTION

In the terminology used in the present application a receiver is an entity which is intended for handling a signal or a multipath component of the signal. After this handling the receiver outputs a bit set including at least one bit. In one embodiment of the present invention the bit set is interpretable as a symbol. A first receiver and a second receiver differ form each other, if they may output different bit sets in response to the same input. In one embodiment the receiver comprises at least one other entity, such as an equalizer.

Figure 1:
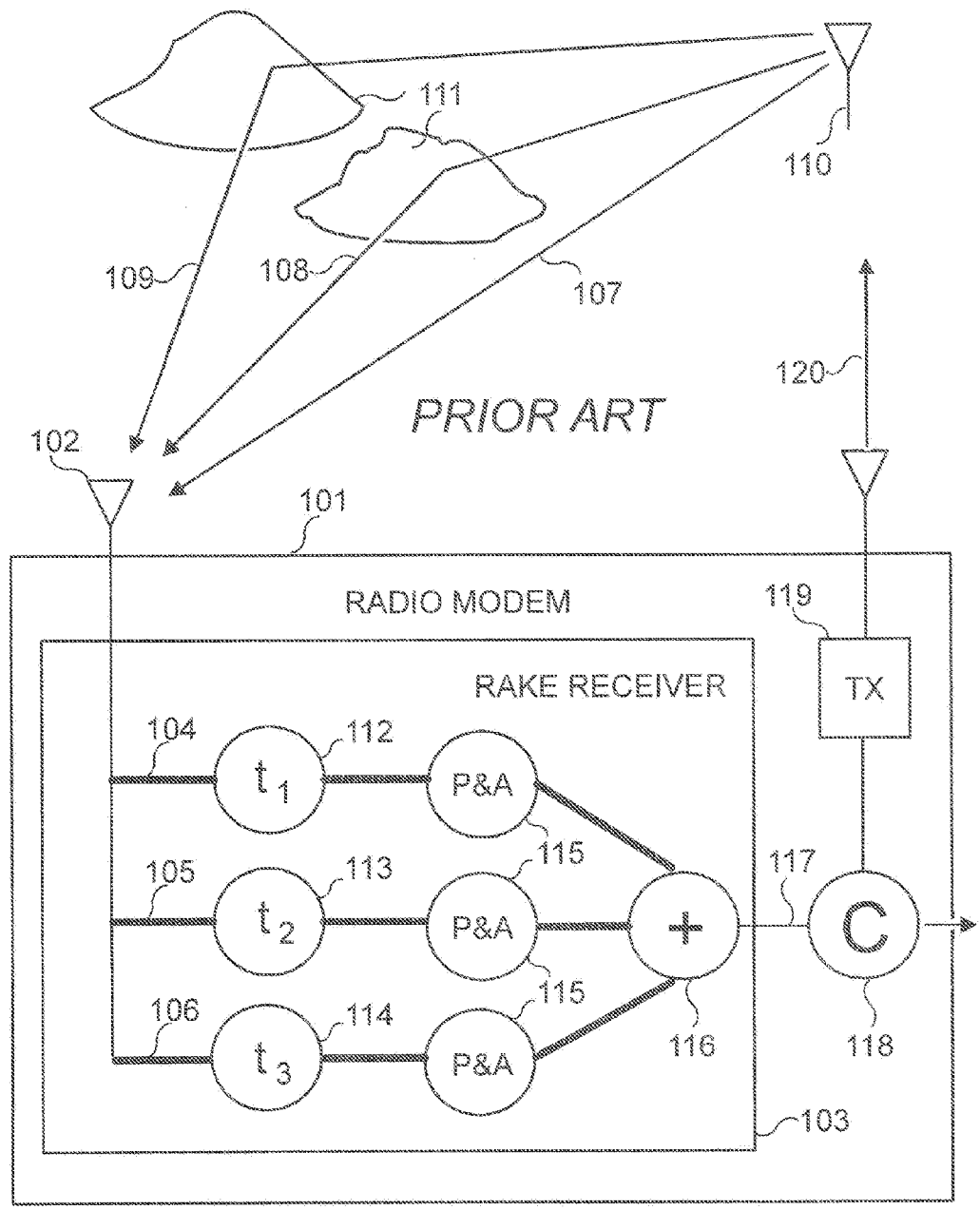
FIG. 1 is a block diagram that shows an example of a radio modem and a rake receiver.
Figure 2:
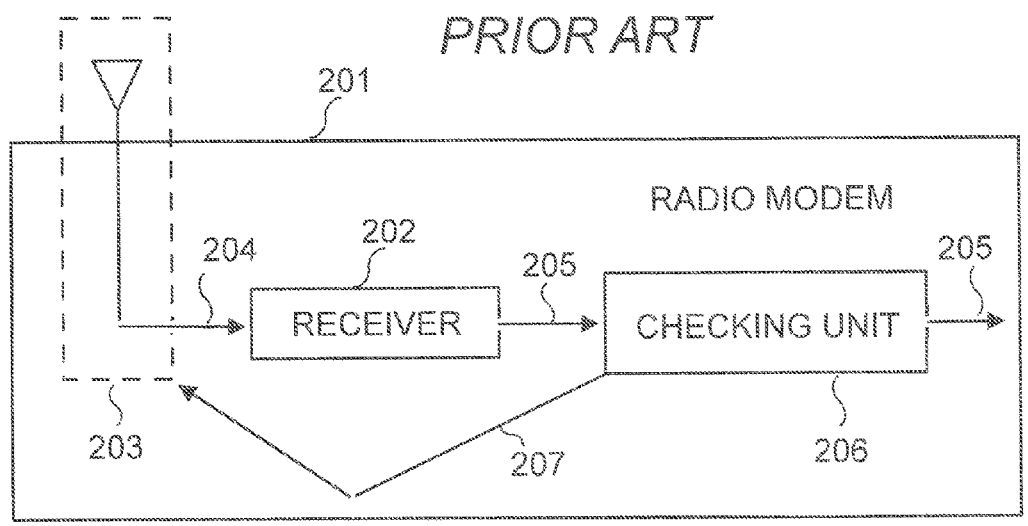
FIG. 2 is a block diagram that illustrates certain basic principles of a prior art radio modem.
Figure 3:
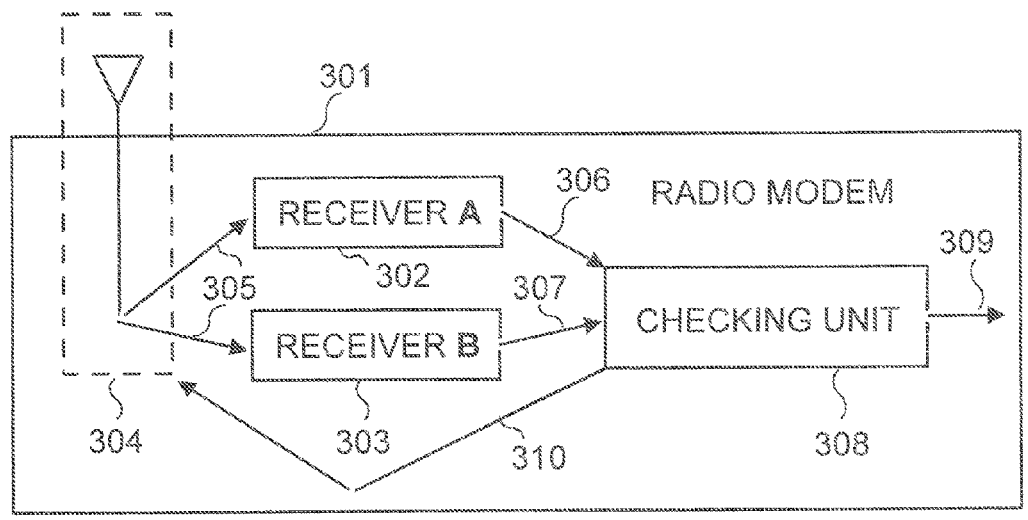
FIG. 3 is a block diagram that illustrates a radio modem in accordance with an embodiment of the invention.

FIG. 3 shows a radio modem 301 in accordance with an embodiment of the invention. When comparing the radio modem 301 to the prior art radio modem 201 it can be seen that the radio modem 301 comprises an additional receiver. The radio modem 301 comprises receive A (302) and receiver B (303) which differ form each other. The additional receiver increases the probability that at least one of the receivers determines a correct bit set. The radio modem operates so that both receivers (302, 303) receive though an antenna set 304 a same signal, or a multipath component of the signal, as an input 305. This antenna set 304 comprises at least one antenna. Then, as a response to the same input 305, receiver A (302) outputs a bit set 306 and receiver B (303) outputs a bit set 307. During good RF conditions both bit sets (306, 307) are the same, i.e. both receivers were able to determine the correct bits. Then a checking unit 308 may output 309 either of the sets and the handling of the correct bit set continues, for example, in layer 2 (L2). On the other hand, when the RF conditions turn to bad both receivers, or either of them, may fail. If they both fail, the checking unit 308 generates a retransmission request 310. Alternatively, if receiver B fails but receiver A is able to determine the correct bit set, the checking unit outputs 309 the bit set 306 of receiver A. Correspondingly, if receiver A fails but receiver B successfully determines the correct bit set, the checking unit outputs 309 the bit set 307 of receiver B. One obvious benefit provided by the radio modem 301 is that there is no need for the retransmission request 310 when at least one of the receivers (302, 303) is able to determine the correct bit set. Because the radio modem 301 decrease the number of retransmission requests, the transmission involves less latency, which enhances the user experience. Low latency is important, for example, in video transmissions.

As generally known, a signal or a multipath component of the signal is handled sample-by-sample in a radio modem. The number of multipath components usually varies during a transmission. The transmission is, for example, a movie which is composed a number of bits. Those bits are transmitted to the UE in at least one signal. In more detail, the UE receives the bits in the samples of the at least one signal. When using the dual cell HSDPA, the movie is transmitted to the UE by two signals. Each of these signals is handled sample-by-sample in the radio modem. In more detail, at least some of the samples are examined by at least two receivers.

Figure 4:
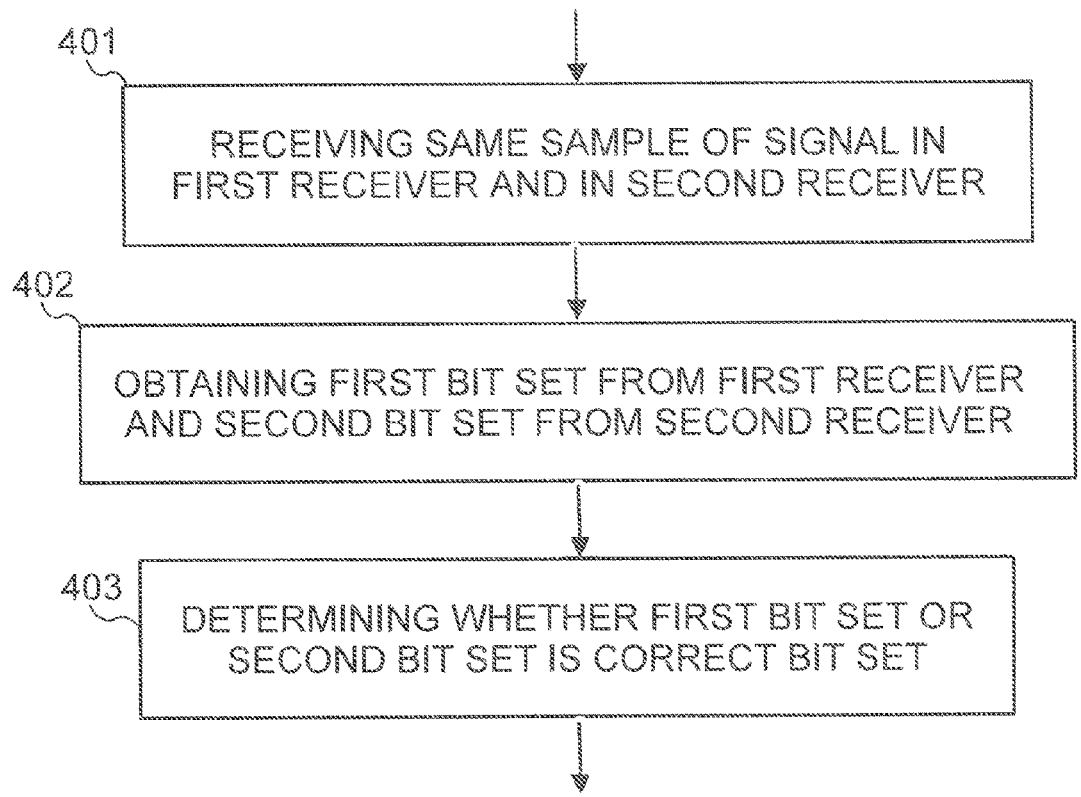
FIG. 4 is a flow diagram that shows a method of signal reception in accordance with an embodiment of the present invention.

FIG. 4 shows a method of signal reception. The method is intended for signal reception in a radio access network and it comprises the following to be performed in a radio modem: receiving 401 the same sample of a signal in a first receiver and in a second receiver and then, in response to the same sample, obtaining 402 a first bit set from the first receiver and a second bit set from the second receiver, and finally determining 403 whether the first bit set or the second bit set is a correct bit set.

The radio modem 301 obeys the method shown in FIG. 4 and thus receiver A and receiver B receiver substantially simultaneously the same input. Then the checking unit 308 obtains the bit set 306 from receiver A and the bit set 307 from receiver B and determines which of the bit sets is correct. The bit sets 306 and 307 are originated from different receivers, thus the bit sets are independent interpretations of original data, i.e. the movie or some other data that is transmitted to the UE.

Figure 5:
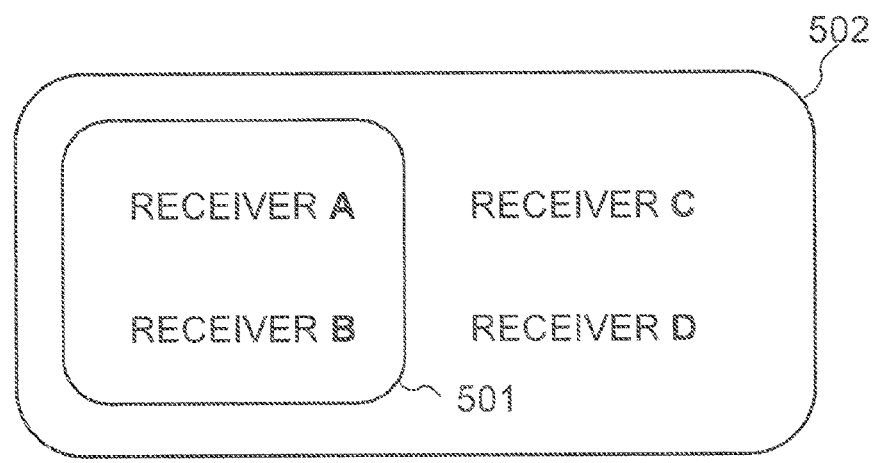
FIG. 5 is a block diagram that shows an example of a receiver group and a group of available receivers.

FIG. 5 shows an example of a receiver group and a group of available receivers. The receiver group 501 comprises those receivers (receiver A and receiver B) which are currently in use in the radio modem. When RF circumstances changes, it may be advisable to replace both or either of the receivers with another receiver. The group of available receivers 502 comprises, in addition to receiver A and receiver B, receiver C and receiver D. For example, receiver A can be replaced with receiver C or receiver D. In FIG. 5 the receiver group comprises two receivers, but in good RF circumstances one receiver would be enough. Thus, it is possible to remove a receiver from the receiver group 501 and use only the best receiver. Because the RF circumstances changes, the same receiver is not the best one all the time.

When a number of receivers included in a receiver group is marked with M and a number of receivers included in a group of available receivers is marked with N the following conditions are valid: $1 \leq M \leq N$, where $N \geq 2$.

In one embodiment of the present invention a receiver group is a fixed group, i.e. it includes continuously the same receivers. For example, receiver group 501 could comprise receivers A and B which are continuously used in the signal reception.

In another embodiment of the present invention the receiver group is non-fixed and the composition of the receiver group is changed in a predetermined way, which is illustrated in the following. The radio modem 301 has a error-timer and it uses a first only receiver A. In other words, the receiver group 501 comprises, by default, receiver A. If receiver A outputs an erroneous bit set, the radio modem 301 takes receiver B in use and starts the error-timer. Now the receiver group 501 comprises receiver A and receiver B until the error-time expires. Then the radio modem 301 removes receiver B from the receiver group 501 and uses again only receiver A. Thus, the idea is to use two receivers on a time period defined by the error-timer, if an erroneous bit set is detected by the checking unit 308. The error-timer can be restarted each time a new erroneous bit set is detected.

Also the following example illustrates one embodiment in which the receiver group is non-fixed and the composition of the receiver group is changed in a predetermined way. The default receiver group comprise only receiver A. If receiver A outputs an erroneous bit set, receivers B and C are added into the receiver group 501. In this embodiment receives A, B, and C have the same operation logic but different parameterization. These operation parameters are numerical values. Receiver A uses such operation parameter value which is expected to be the best possible value, receiver B uses a parameter value which is smaller than receiver A's value, and receiver C uses a parameter value which is bigger than receiver A's value. The idea is to cover parameter values so largely that retransmission requests are rarely needed when receivers A, B, and C are in use. The three receivers are simultaneously in use on a time period defined by the error-timer. Thus time period should be set short, because the simultaneous use of the three receives increases the power consumption of the radio modem 301.

For example, on or more of the following parameters could be used as the operation parameters: 1) a noise estimate intended for an inversion of a channel covariance matrix, 2) a length of a channel estimation period, and/or 3) weighting coefficients intended for combining original and retransmitted data. When receivers differ due to the parameters 1)-3) from each other, they have different values in at least one operation parameter. The parameters 1)-3) are channel-dependent and the parameters are used in the first receiver and in the second receiver.

As mentioned in the above, it is possible to change the current composition of the receiver group 501. The changing comprises, for example, adding a third receiver into the receiver group 501 and starting to use the third receiver in the signal reception. Alternatively, the changing comprises: stopping a use of a receiver and removing the receiver from the receiver group 501. The composition of the receiver group 501 can be changed on different basis, which is illustrated in the following.

In one embodiment, the changing is performed when the first bit set and the second bit set are erroneous. The erroneous bits sets are clear signs that some other receiver should be used in the signal reception.

In one embodiment, the changing is performed when the first bit set and the second bit set are erroneous and a bit error rate (BER) exceeds a predetermined limit. A BER is the percentage of those bits that are erroneous compared to the total number of bits received the radio modem. The BER is expressed as 10 to a negative power. For example, in a transmission with the BEr of $10^{-6}$ there is one erroneous bit per 1,000,000 received bits.

In one embodiment, the changing is performed when a certain action is to happen. The certain action is, for example, a handover. Thus, the composition of the receiver group is changed before bits are lost during the handover. In one embodiment, the changing means that at least one receiver is added before a handover into the receiver group 501 and the at least one receiver is removed after the handover from the receiver group. The receiver group 501 may include just one receiver between handovers to save power at the UE.

In one embodiment, the changing is performed when a certain effect is detected in the signal reception. The certain effect is, for example, a Doppler effect that deteriorates operation of various receivers. Then such receiver is added into the receiver group which operates well despite of the certain effect. Another example of the certain effect is losing a line-of-sight signal, which can be detected by analyzing the signal to be received. Still another example of the certain effect is an interference caused by other UEs. This effect can be detected, for example, at the UE by measuring and analyzing the interferences. If the UE comprises a Global Positioning System (GPS) receiver, the UE could measure its velocity. Thus, the UE's high velocity is still another example of the certain effect.

As mentioned in the above, receivers may differ from each other due to theirs parameters or operation logics. The following example concerns an advanced receiver whose operation logic should be appropriate when the UE moves fast. According to the abstract of a paper: Pietraski, P., "Dynamic Performance of a Chip Level Adaptive Equalizer in a UMTS High Speed Downlink Packet Access (HSDPA) Terminal", Vehicular Technology Conference, 2006. VTC-2006 Fall, 2006 IEEE $64^{th}$, the advanced receiver supports mobile velocities as high as 250 km/h. The receiver comprises an equalizer that works with radio and implementation impairments typical of a non-HSDPA receiver. In addition to this example, a person skilled in the art can find other usable receivers and equalizers.

Figure 6:
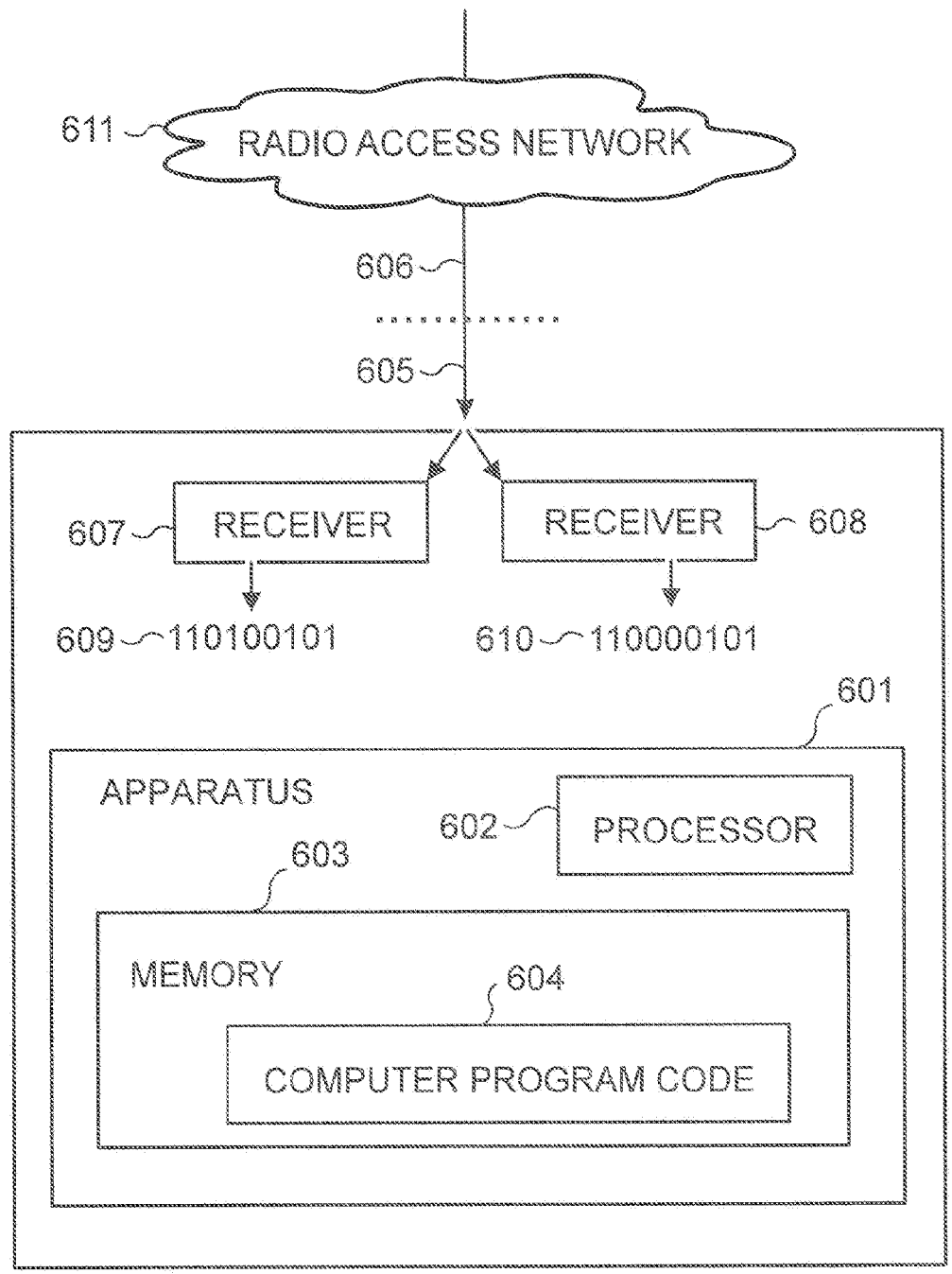
FIG. 6 is a block diagram that shows an apparatus for receiving a radio signal according to an embodiment of the invention.

FIG. 6 shows an apparatus 601 comprising at least one processor 602 and at least one memory 603 including computer program code 604. The at least one memory 603 an the computer program code 604 are configured to, with the at least one processor 602, cause the apparatus 601 to perform at least the following. First, the apparatus 601 receives the same sample 605 of a radio signal 606 in a first receiver 607 and in a second receiver 608. In response to the same sample 605, the apparatus 601 obtains a first bit set 609 from the first receiver 607 and a second bit set 610 from the second receiver 608. Then the apparatus 601 determines whether the first bit set 609 or the second bit set 610 is a correct bit set. This determining is performed, for example, by using the CRC. The signal 606 is transmitted in a radio access network 611 either in a downlink direction or in an uplink direction. The apparatus 601 is, for example, a radio modem. Alternatively, the apparatus is, for example, a UE or a base station serving the UE. If the signal 606 has multipath components, the sample 605 is taken from one of the multipath components. The apparatus 601 needs to send a retransmission request only when the first bit set 609 and the second bit set 610 are erroneous.

The apparatus 601 may receive simultaneously multiple signals. For example, two signals in the dual-cell HSDPA. Then the apparatus receives another radio signal simultaneously with the radio signal 606 (not shown in FIG. 6).

The following options of the apparatus 601 relate to changing the composition of the receiver group 501. The apparatus 601 stops a use of the first receiver or a use of the second receiver. This stopping is performed when the first bit set and the second bit set are erroneous. At some point of time, the apparatus 601 starts a use of the first receiver or a use of the second receiver. The apparatus may start the use in a proactive matter. In other words, the starting is performed when a certain action is to happen, or when a certain effect is detected in the radio signal. Examples of the certain action and the certain effect are given in the above.

The first receiver 607 and the second receiver 608 operates differently. As shown in FIG. 6 they output different bit sets 609 and 610. Assuming that the CRC indicates the bit set 110000101 to be the correct bit set, that piece of data is successfully received at the apparatus 601. In one embodiment the receivers 607 and 608 have the same operation logic but they differ due to at least one operation parameter from each other. The operation parameters are discussed in the following.

In one embodiment of the invention, the operation parameter is a noise estimate intended for an inversion of a channel covariance matrix. The noise is in this context an error or undesired random disturbance of the radio signal 606. The noise, however, is typically distinguished from interference, such as cross-talk, deliberate jamming or other unwanted electromagnetic interference. A signal-to-noise ration (SNR) value is one appropriate value as the noise estimate. Another appropriate value for the noise estimate is "Signal to Interference plus Noise Ratio" (SINR). The SINR is expressed in dB and is calculated as SINR=P/(I+N), where P is signal power, I is interference power, and N is noise power.

The term "channel state information" (CSI) refers to current channel properties. This information described how the radio signal 606 propagates from the transmitter to the receives 607 and 608. In more detail, the CSI represents an effect of one or more phenomenons, such as scattering, fading, and so-called power decay with distance. Statistical CSI (or long-term CSI) means that a statistical characterization of the channel is known. A Rayleigh fading channel is one example of the channel having the statistical CSI.

Statistical characterizations of a channel are usually expressed with a matrix. A channel matrix H is calculated as $H=[h_1 \ h_2 \ \ldots \ h_{Nt}]$. Then a channel covariance matrix R is calculated as $R=H^H H$. The matrices H and R are discussed in detail in pages 33-65 of lecture notes which are incorporated herein by reference. The lecture note pages are from http://www.comlab.hut.fu/studies/3280/Lectures/ARTM_equalize_2_LinearRx.pdf. If the Internet link does not work, the lectures notes are available in United States Patent and Trademark Office's (USPTO) into which they are delivered as Information Disclosure Statement (IDS) material. Pages 56-57 of the lecture notes give an example of the channel covariance matrix and page 52 gives an example an inversion of the channel covariance matrix. This invention is termed an "inversion matrix". To summarize, the noise estimate in the above-described embodiment is, for example, a SNR value or a SINR value. In one embodiment of the invention, the operation parameter is a length of a channel estimation period. This length is measured in milliseconds. The channel estimation can be performed using different methods. One appropriate channel estimate for an UE of HSPA network is a signal-to-interference ratio (SIR). A known method, which calculates the SIR, outputs different SIR values depending on the length of the channel estimation period.

In one embodiment of the invention, the operation parameter comprises weighting coefficients intended for combining original and retransmitted data. In statistics, a distance-weighted estimator is a measure of central tendency, where a weighting coefficient for each data point is computed as the inverse mean distance between a certain data point and the other data points. When the certain data point is marked with $x_i$ the weighting coefficient for $x_i$ is calculated as the inverse mean distance between $x_i$ and the other data points:

$$w_i = \frac{n-1}{\sum_{j=1}^{n} |x_i - x_j|}.$$

The combining of the original data and the retransmitted data can be performed, for example, using an appropriate diversity combining technique, such as Maximal-ratio combining. In Maximal-ratio combining samples of the radio signal 606 are weighted with respect to their SNR values and then summed. The result is $SNR_M$ that is calculated as $$\sum_{k=1}^{N} SNR_k$$

where $SNR_k$ is SNR of signal sample k. In more detail, Maximal-ratio combining is performed for two sets of the samples of the ratio signal 606, wherein a first set of the samples relate to the original data and a second set of the samples relate to the retransmitted data. The weighting coefficients effect to the results of this combining, i.e. they effect to the $SNR_M$ value.

To summarize, the operation parameter values result in certain values such as SNR values, SINR values, SIR values, and $SNR_M$ values, and the resulted SNR values, the SINR values, the SIR values, and the $SNR_M$ values effect, in one way or other, to the operation of the receivers 607 and 608. Thus, by changing the operation parameter values, the operation of the receivers 607 and 608 can be changed.

A radio access network can efficiently be deployed in both the paired and unpaired spectrums. The basic principle of TDD is to use the same frequency band for transmission and reception. This is a fundamental difference compared to Frequency Division Duplex (FDD) where different frequencies are used for continuous UE reception and transmission. The TDD and FDD modes have been greatly harmonized in sense that the both modes share the same underlying framework, including radio access schemes Orthogonal Frequency Division Multiplexing Access (OFDMA) in downlink and Single Carrier Frequency Division Multiplexing Access (SC-FDMA) in uplink direction, and a concept of a subframe. The TDD mode is included together with the FDD mode in many specifications, including also physical layer specification. The harmonization has resulted in that in terms of architecture to TDD mode and the FDD mode are very similar.

The exemplary embodiments described in the above may include, for example, any suitable network devices, base stations, eNodeBs, RAN devices, laptop computers. Internet appliances, handheld devices, cellular telephones, smart phones, wireless devices, and the like, capable of performing the processes of the exemplary embodiments. The devices and subsystems of the exemplary embodiments can communicate with each other using any suitable protocol and they may be implemented using one or more programmed computer systems or devices.

The present invention may be implemented in software, hardware, application logic or a combination of software, hardware and application logic. The application logic, software or instructions set is maintained on any one of various conventional computer-readable media. In the context of this document, a "computer-readable medium" may be any media or means that contain, store, communicate, propagate or transport the instructions for use by or in connection with an instruction execution system, apparatus, or device, such as a computer. A computer-readable medium may comprise a computer-readable storage medium that may be any media or means that contain or store the instructions for use by or in connection with an instruction execution system, apparatus, or device, such as a computer.

The exemplary embodiments can store information relating to various processes described herein. This information can be stored in one or more memories, such as a hard disk, optical disk, magneto-optical disk, RAM, and the like.

All or a portion of the exemplary embodiments can be conveniently implemented using one or more general purpose processors, microprocessors, digital signal processes, microcontrollers, and the like, programmed according to the teachings of the exemplary embodiments of the present invention, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present invention can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program of an embodiment of the present invention for performing all or a portion (if processing is distributed) of the processing performed in implementing the present invention. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like.

While the present invention has been described in connection with a number of exemplary embodiments, and implementations, the present invention is not so limited, but rather covers various modifications, and equivalent arrangements, which fall within the purview of prospective claims.

What is claimed is:

1. A method of signal reception in a radio access network, the method performed in a radio modem and comprising:
   receiving a same sample of a signal in each receiver of a first group of more than one receiver of the radio modem;
   obtaining a respective bit set from each respective receiver of the first group;
   independently checking each respective bit set to determine whether the respective bit set is a correct bit set;
   at least for the case in which one or more of the respective bit sets is not the correct bit set, replacing the first group of at least one receiver with a different second group of at least one receiver of the radio modem for subsequent signal reception; and
   sending a retransmission request only when each respective bit set from each respective receiver of the first group is determined from the checking to be not the correct bit set.

2. The method according to claim 1, wherein a receiver of the first group and a receiver of the different second group differ due to at least one operation parameter from each other, wherein the at least one operation parameter comprises at least one of the following parameters:
   1) a noise estimate intended for an inversion of a channel covariance matrix,
   2) a length of a channel estimation period,
   3) weighting coefficients intended for combining original and retransmitted data.

3. The method according to claim 1, wherein a receiver of the first group differs due to different operation logic from a receiver of the second group.

4. The method according to claim 1, wherein the independent checking is based on a cyclic redundancy check.

5. The method according to claim 1, wherein the received signal comprises multipath components of the signal.

6. The method according to claim 1, wherein the first group consists of a first receiver and a second receiver and the method comprises taking a third receiver into use in the second group in response to the bit sets from the first receiver and the second receiver each being determined from the checking to be not the correct bit set.

7. The method according to claim 1, wherein the method comprises taking a receiver that is not in the first group into use when at least one of the following is detected in the signal:
   the each respective bit set of the first group are determined from the checking not to be the correct bit set and a bit error rate exceeds a predetermined limit;
   a Doppler effect that deteriorates operation of at least one receiver of the first group; and
   losing from the signal a line of sight multipath component.

8. The method according to claim 1, wherein the different second group is taken into use for a duration of an error timer which is started when the second group is taken into use and restarted each time a bit set output from at least one receiver of the second group is determined to be not the correct bit set.

9. The method according to claim 8, the method further comprising:
   on expiry of the error timer, stopping use of the second group and putting the first group of more than one receiver back into use for signal reception.

10. An apparatus for receiving a radio signal, comprising:
    at least one processor; and
    at least one memory including computer program code,
    the at least one memory and the computer program code configured to, with the at least one processor, cause the apparatus to perform at least the following:
    receive a same sample of the radio signal in each receiver of a first group of more than one receiver of a radio modem;
    obtain a respective bit set from each respective receiver of the first group;
    independently check each respective bit set to determine whether the respective bit set is a correct bit set;
    at least for the case in which one or more of the respective bit sets is not the correct bit set, replacing the first group of at least one receiver with a different second group of at least one receiver of the radio modem for subsequent signal reception; and
    send a retransmission request only when each respective bit set from each respective receiver of the first group is determined from the checking to be not the correct bit set.

11. The apparatus according to claim 10, wherein a receiver of the first group and a receiver of the second group differ due to at least one operation parameter from each other, wherein the at least one operation parameter comprises at least one of the following parameters:
    1) a noise estimate intended for an inversion of a channel covariance matrix,
    2) a length of a channel estimation period,
    3) weighting coefficients intended for combining original and retransmitted data.

12. The apparatus according to claim 10, wherein a receiver of the first group differs due to different operation logic from a receiver of the second group.

13. The apparatus according to claim 10, wherein the independent checking is based on a cyclic redundancy check.

14. The apparatus according to claim 10, wherein the at least one memory and the computer program code are configured, with the at least one processor, to cause the apparatus to perform:
    receiving another radio signal simultaneously with the radio signal.

15. The apparatus according to claim 10, wherein the second group is formed from the first group by stopping a use of an individual receiver in the first group based on the determination that the respective bit set of the individual receiver is not the correct bit set.

16. The apparatus according to claim 15, wherein the stopping is performed when the respective bit set of the individual receiver is determined by the checking to be not the correct bit set.

17. A non-transitory computer readable medium storing computer software comprising computer program code, the computer program code comprising:
   code for receiving a same sample of a signal in each receiver of a first group of more than one receiver of a radio modem;
   code for obtaining a respective bit set from each respective receiver of the first group;
   code for independently checking each respective bit set to determine whether the respective bit set is a correct bit set;
   at least for the case in which one or more of the respective bit sets is not the correct bit set, replacing the first group of at least one receiver with a different second group of at least one receiver of the radio modem for subsequent signal reception; and
   code for sending a retransmission request only when each respective bit set from each respective receiver of the first group is determined from the checking to be not the correct bit set.

* * * * *

UNITED STATES PATENT AND TRADEMARK OFFICE
CERTIFICATE OF CORRECTION

| | | |
|---|---|---|
| PATENT NO. | : 9,014,316 B2 | Page 1 of 1 |
| APPLICATION NO. | : 13/890474 | |
| DATED | : April 21, 2015 | |
| INVENTOR(S) | : Arto Ilmari Huotari et al. | |

It is certified that error appears in the above-identified patent and that said Letters Patent is hereby corrected as shown below:

ON THE TITLE PAGE
Column 1, (72) Inventors: delete "Arto Ilmari Houtari" and insert --Arto Ilmari Huotari--

Signed and Sealed this
First Day of December, 2015

Michelle K. Lee
*Director of the United States Patent and Trademark Office*